United States Patent
Joshi et al.

(10) Patent No.: US 11,671,282 B2
(45) Date of Patent: Jun. 6, 2023

(54) METHOD AND SYSTEM FOR DYNAMICALLY ACTIVATING VIRTUAL NETWORKS IN A DISTRIBUTED TUNNEL FABRIC

(71) Applicant: Hewlett Packard Enterprise Development LP, Houston, TX (US)

(72) Inventors: Vinayak Joshi, Bangalore (IN); Venkatavaradhan Devarajan, Bangalore (IN); Rajib Majila, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/328,485

(22) Filed: May 24, 2021

(65) Prior Publication Data
US 2022/0376950 A1    Nov. 24, 2022

(51) Int. Cl.
*H04L 12/46*    (2006.01)
(52) U.S. Cl.
CPC ...... *H04L 12/4641* (2013.01); *H04L 12/4633* (2013.01)
(58) Field of Classification Search
CPC .......................... H04L 12/4641; H04L 12/4633
See application file for complete search history.

(56) References Cited

U.S. PATENT DOCUMENTS

| | | | | |
|---|---|---|---|---|
| 7,633,956 B1* | 12/2009 | Parandekar | ......... | H04L 12/2898 370/429 |
| 8,416,789 B1* | 4/2013 | Busch | ................. | H04L 12/4658 370/401 |
| 8,644,134 B2* | 2/2014 | Sajassi | .................. | H04L 12/437 370/452 |
| 8,767,587 B1* | 7/2014 | Finn | ........................ | H04L 41/12 370/255 |
| 8,953,590 B1* | 2/2015 | Aggarwal | ........... | H04L 12/4675 370/409 |
| 9,838,337 B1* | 12/2017 | Pinnamraju | ........... | H04L 63/101 |
| 10,897,420 B1* | 1/2021 | Pianigiani | ............... | H04L 45/54 |
| 11,171,834 B1* | 11/2021 | Bockelmann | ....... | G06F 9/45558 |
| 11,431,567 B1* | 8/2022 | JeevaRaj | ............. | H04L 41/0806 |
| 2013/0114465 A1* | 5/2013 | McGovern | .............. | H04L 41/40 370/254 |
| 2014/0040459 A1* | 2/2014 | Agrawal | ............. | H04L 12/4641 709/224 |

(Continued)

*Primary Examiner* — Blake J Rubin
(74) *Attorney, Agent, or Firm* — Park, Vaughan, Fleming & Dowler LLP

(57) ABSTRACT

A system for dynamically activating a virtual network is provided. During operation, the system can operate a switch as a tunnel endpoint of a tunnel in conjunction with a remote switch. The tunnel can facilitate a virtual private network (VPN) spanning the switch and the remote switch. The system can maintain an inactive state for a virtual local area network (VLAN) and a corresponding tunnel network identifier identifying the VLAN for the tunnel. If a notification indicating the activation of the VLAN at a downstream switch is received by the switch, the switch can activate the VLAN at the switch. The system can then activate the tunnel network identifier in a routing process of the VPN, thereby enabling sharing of a media access control (MAC) address associated with the VLAN via the tunnel.

20 Claims, 10 Drawing Sheets

(56) References Cited

U.S. PATENT DOCUMENTS

| | | | |
|---|---|---|---|
| 2014/0064286 A1* | 3/2014 | K.S | H04L 12/4679 370/395.53 |
| 2014/0211641 A1* | 7/2014 | Gohite | H04L 45/28 370/252 |
| 2014/0294012 A1* | 10/2014 | Nagarajan | H04L 49/35 370/401 |
| 2014/0372576 A1* | 12/2014 | Mohandas | H04L 49/354 709/220 |
| 2015/0019697 A1* | 1/2015 | Badoni | H04L 41/0813 709/221 |
| 2015/0271010 A1* | 9/2015 | Shetty | H04L 41/0886 709/220 |
| 2015/0372986 A1* | 12/2015 | Fountain | H04L 12/4641 726/3 |
| 2016/0285761 A1* | 9/2016 | Dong | H04L 12/4641 |
| 2017/0171057 A1* | 6/2017 | Dong | H04L 45/02 |
| 2017/0317919 A1* | 11/2017 | Fernando | H04L 41/40 |
| 2018/0013654 A1* | 1/2018 | Kapadia | H04L 41/0856 |
| 2019/0327113 A1* | 10/2019 | Kandasamy | H04W 76/18 |
| 2020/0021523 A1* | 1/2020 | Wang | H04L 45/74 |
| 2020/0177503 A1* | 6/2020 | Hooda | H04L 45/64 |
| 2020/0287826 A1* | 9/2020 | Wang | H04L 12/4633 |
| 2020/0322268 A1* | 10/2020 | Thoria | H04L 12/66 |
| 2020/0328941 A1* | 10/2020 | Feiguine | H04L 41/0895 |
| 2022/0021613 A1* | 1/2022 | Venkatasubbaiah | H04L 45/586 |
| 2022/0029915 A1* | 1/2022 | Moreno | H04L 12/4641 |
| 2022/0150312 A1* | 5/2022 | Ranpise | H04L 12/4641 |
| 2022/0224598 A1* | 7/2022 | Siddabathuni | H04L 41/0895 |
| 2022/0224626 A1* | 7/2022 | Adiga H R | H04L 45/02 |
| 2022/0272033 A1* | 8/2022 | Jain | H04L 45/302 |
| 2022/0311733 A1* | 9/2022 | Kawada | H04L 12/4641 |

\* cited by examiner

METHOD AND SYSTEM FOR DYNAMICALLY ACTIVATING VIRTUAL NETWORKS IN A DISTRIBUTED TUNNEL FABRIC

BACKGROUND

Field

The present disclosure relates to communication networks. More specifically, the present disclosure relates to a method and system for dynamically activating a virtual network in a distributed tunnel fabric.

BRIEF DESCRIPTION OF THE FIGURES

In the figures, like reference numerals refer to the same figure elements.

DETAILED DESCRIPTION

Figure 1:
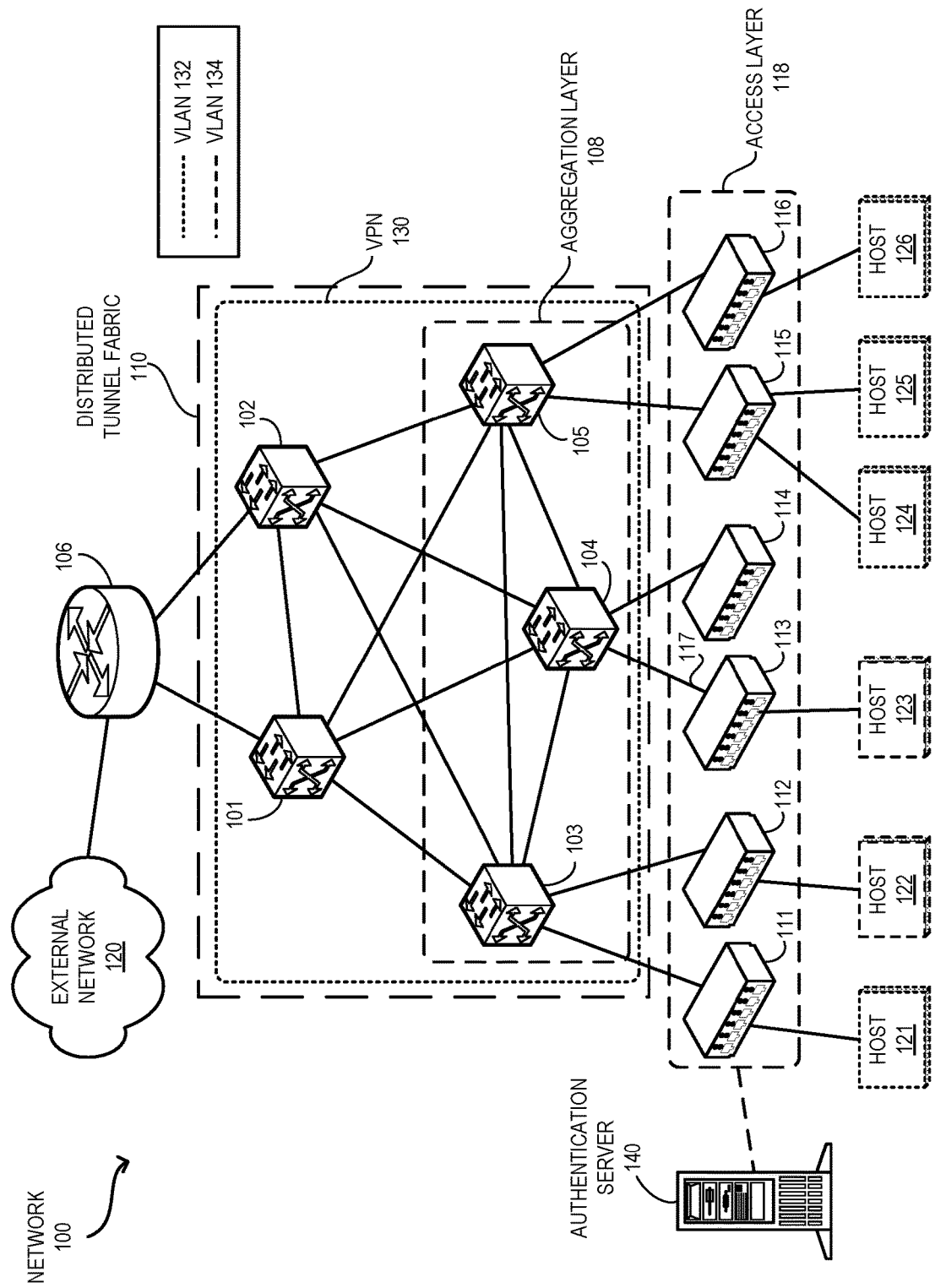
FIG. 1 illustrates an exemplary network facilitating dynamic activation of virtual networks, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs).

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed.

The VPN can be deployed over tunnels formed among the backbone (or non-access) switches of a network. For example, if a network includes core, aggregation, and access switches, the core and access switches of the network can be referred to as the backbone switches. The set tunnels among the backbone switches can form an overlay tunnel fabric. In other words, the backbone switches of the tunnel fabric can operate as the tunnel endpoints and facilitate routing over the tunnels. On the other hand, the access switches receive the packets from hosts (or client devices) and facilitate the packet distribution underlay. Since a VPN can be distributed across the tunnel fabric, a VPN over tunnel fabric can also be referred to as a distributed tunnel fabric.

One aspect of the present technology can provide a system for dynamically activating a virtual network. During operation, the system can operate a switch as a tunnel endpoint of a tunnel in conjunction with a remote switch. The tunnel can facilitate a VPN spanning the switch and the remote switch. The system can maintain an inactive state for a VLAN and a corresponding tunnel network identifier identifying the VLAN for the tunnel. If a notification indicating the activation of the VLAN at a downstream switch is received by the switch, the system can activate the VLAN at the switch. The system can then activate the tunnel network identifier in a routing process of the VPN, thereby allowing sharing of a media access control (MAC) address associated with the VLAN via the tunnel.

In a variation on this aspect, the system can preclude the switch from learning the MAC address in the inactive state for the tunnel network identifier.

In a variation on this aspect, if the tunnel network identifier is activated in the routing process of the VPN, the system can receive multi-destination traffic associated with the VLAN via the tunnel.

In a variation on this aspect, if a second notification indicating the deactivation of the VLAN at a downstream switch is received by the switch, the system can determine whether the VLAN is active in another downstream switch. If the VLAN is not active in another downstream switch, the system can deactivate the VLAN and the tunnel network identifier at the switch.

In a further variation, the system can deactivate the tunnel network identifier further by withdrawing from the routing process of the VPN.

In a variation on this aspect, the system can maintain an indicator indicating an initial activation and a final deactivation of the VLAN among all downstream access switches. The system can then activate and deactivate the VLAN at the switch based on a value of the indicator.

In a variation on this aspect, the downstream switch can be an access switch outside of the VPN. The switch can be an aggregate switch configured to aggregate traffic from one or more access switches.

In a variation on this aspect, the notification can be a Multiple VLAN Registration Protocol (MVRP) data unit. The switch and the downstream switch can then deploy MVRP to discover VLANs.

In a further variation, the system can decapsulate a tunnel encapsulation header of a packet received from a second tunnel between the switch and the downstream switch. The system can then obtain the MVRP data unit from the packet based on the decapsulation.

In a variation on this aspect, the VLAN and the tunnel network identifier can be pre-configured at the switch. The system can then maintain the inactive state for the tunnel network identifier by maintaining an inactive state for the pre-configuration.

The aspects described herein solve the problem of dynamically activating a virtual network in a distributed tunnel fabric by (i) obtaining notifications from a downstream switch regarding first and last hosts associated with a VLAN; and (ii) dynamically activating and deactivating the VLAN and a corresponding TNI based on the notifications. In this way, a switch can participate in information sharing and routing in the distributed tunnel fabric for a particular TNI if at least one host with a corresponding VLAN is under its coverage.

Typically, hosts, which can be user or client devices, need to authenticate to connect to a VPN (e.g., based on an authentication process). Examples of hosts can include, but are not limited to, laptops, desktops, printers, cellphones, tablets, Internet of Things (IoT) devices, and appliances. With existing technologies, a host can be coupled to an access switch for accessing the fabric. The access switch can then authenticate the host from an authentication server based on the authentication process, such as port-based or username/password-based authentication. The port-based authentication can be based on the Institute of Electrical and Electronics Engineers (IEEE) 802.1X standard. Based on the successful authentication, the access switch can determine a host type and allocate a VLAN to the host based on the host type.

The host type may indicate the affiliation between the user of the host and the entity (e.g., an enterprise or organization) associated with the VPN. The host type can indicate one or more of: a department, a level of access, and a domain of communication). For example, if the host is associated with a user with administrative privilege, the host can be placed on an administrator VLAN. On the other hand, if the host is associated with a guest user, the host can be placed on a guest VLAN. The access switch can then forward packets from the host to the fabric via the allocated VLAN. In other words, the access switch may perform the VLAN tagging for the packets from the host. However, since different types of users may couple to the access switch at any time, and such access pattern may not be predictable, the access switch may not have a host belonging to a particular VLAN under its coverage. To ensure that a host belonging to that VLAN can join the coverage of the access switch and send packets, the access switch may need to maintain all VLANs configured in the network.

Since an aggregate switch of the tunnel fabric is configured to aggregate traffic from access switches, a respective access switch is typically coupled to an aggregate switch. Consequently, the packets forwarded by the access switch can enter the tunnel fabric via an aggregate switch. Upon receiving the packet, the aggregate switch can determine a TNI associated with the VLAN of the packet and determine a remote tunnel endpoint based on the header information of the packet. The aggregate switch can maintain a mapping between the VLAN and the TNI for determining the TNI. The aggregate switch can then encapsulate the packet with a tunnel header with the TNI and a destination address corresponding to the remote tunnel endpoint. Subsequently, the aggregate switch can forward the encapsulated packet via the tunnel to the remote tunnel endpoint. To determine the remote tunnel endpoint and associated forwarding information, the aggregate switch needs to participate in the routing process associated with the VPN based on the TNI. The participation can include sharing (e.g., sending and receiving) routing information with the rest of the distributed tunnel fabric.

Because of the unpredictability of association between a host and an access switch, on which VLAN the aggregation switch may receive traffic is also unpredictable. Hence, the aggregate switch may need to participate in the routing and forwarding for a respective TNI in the VPN. For example, if the VPN is an EVPN and the TNI is a VNI, the aggregate switch may participate in the VRF associated with the EVPN for a respective VNI. Consequently, the aggregate switch may exchange broadcast information with other switches of the fabric (e.g., as an inclusive multicast Ethernet Tag (IMET) route) for the TNI. Even if the aggregate switch may not have a downstream host (e.g., coupled via an access switch) on a VLAN, the corresponding TNI can become part of the broadcast domain. As a result, the aggregate switch may unnecessarily receive multi-destination traffic, such as broadcast, unknown unicast, and multicast (BUM) traffic, associated with the VLAN.

Furthermore, to identify the remote tunnel endpoint for a packet received from an access switch, the aggregate switch may need to know identifying information, such as a media access control (MAC) address, of a respective host reachable via a respective remote switch of the tunnel fabric. A distributed tunnel fabric can facilitate this feature by sharing the learned MAC addresses among the switches of the distributed tunnel fabric. However, if the aggregate switch is not coupled to a downstream host belonging to a VLAN, the aggregate switch does not need to learn the MAC addresses of hosts on that VLAN. Consequently, unnecessarily learned MAC addresses may strain the limited resources of the switch hardware. Moreover, if the aggregate switch needs to maintain the MAC addresses of all hosts coupled to the tunnel fabric and participate in all broadcast domains, triaging and troubleshooting the aggregate switch may become error-prone and cumbersome.

To solve this problem, a respective aggregate switch can be configured with a respective VLAN and a corresponding TNI for a network. The aggregate switch can maintain a mapping between the VLAN and TNI. However, the aggregate switch may maintain the VLAN and TNI pair in an "inactive" state. For example, the aggregate switch may not participate in routing in the distributed tunnel fabric for the TNI. Consequently, other switches of the distributed tunnel fabric may not send multi-destination traffic or learned MAC addresses associated with the VLAN to the aggregate switch. Thus, the aggregate switch can avoid receiving multi-destination traffic or learning MAC address for a VLAN without a downstream host.

Similarly, a respective downstream access switch of the aggregate switch can be configured with a respective VLAN for the network. However, the access switch may maintain the VLAN in an "inactive" state. Since the access switch may not participate in the tunnel fabric, the access switch may not use a TNI. When the access switch receives a packet from a host, upon successful authentication, the access switch can determine a VLAN for the packet. The access switch can then activate the VLAN for the local switch and send a notification message to the aggregate switch regarding the activation of the VLAN. The notification message can be in a format recognizable by both access and aggregate switches. For example, the notification message can be based on a discovery protocol deployed by access and aggregate switches. The notification message may also be a type-length-value or tag-length-value (TLV) message.

Upon receiving the notification message, the aggregate switch can look up the VLAN in the mapping and determine the TNI. The aggregate switch can then activate the VLAN and the TNI. The aggregate switch can also initiate participation in the routing (e.g., in a corresponding VRF) of the tunnel fabric using the TNI. In this way, the aggregate switch can dynamically activate a virtual network in a distributed tunnel fabric. Based on the activation, the aggregate switch can start receiving multi-destination traffic and MAC addresses associated with the VLAN from other switches for the duration of a host belonging to the VLAN remaining under the coverage of a downstream switch.

In some examples, to facilitate the notification of the activation of a VLAN, the aggregate and access switches can deploy a Multiple Registration Protocol (MRP), such as Multiple VLAN Registration Protocol (MVRP). Under such circumstances, the notification message can be based on the MRP. For example, the MRP instance of the access switch can send an MVRP protocol data unit (PDU) indicating the activation of the message to the MRP instance of the aggregate switch. For example, the PDU can be an MVRP JoinIn message. Receiving the PDU, in turn, can trigger the activation of the VLAN and TNI in the aggregate switch.

The aggregate switch can further ensure that a VLAN and the corresponding TNI become inactive if no host belonging to the VLAN remains in the coverage of the downstream access switches. If the last host belonging to the VLAN leaves an access switch, that access switch can deactivate the VLAN and send a notification message, such as a TLV message or a discovery protocol message, to the aggregate switch. In some examples, the notification message can be an MVRP Leave message. Upon receiving the notification message, the aggregate switch can determine whether other hosts belonging to the VLAN remain under the coverage of at least one downstream access switch. If no other host belonging to the VLAN remains, the aggregate switch can deactivate the VLAN and withdraw the TNI from the tunnel fabric. The withdrawal may cause the aggregate switch to stop participating in the VRF associated with the tunnel fabric. However, the VLAN and TNI remain configured in the aggregate switch. If another host joins the coverage of a downstream access switch, the VLAN and TNI can be reactivated.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an exemplary network facilitating dynamic activation of virtual networks, in accordance with an aspect of the present application. A network 100 can include a number of switches and devices. In some examples, network 100 can be an Ethernet, InfiniB and, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. Switches 101 and 102 of fabric 110 can be coupled to a core switch 106. Fabric 110 can be coupled to an external network 120 via switch 106.

In FIG. 1, a respective link in fabric 110 can be a tunnel. Switches of fabric 110 may form a mesh of tunnels. Examples of a tunnel include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN 130, such as an EVPN, can be deployed over fabric 110.

Fabric 110 can include an aggregation layer 108 of aggregate switches 103, 104, and 105. A respective aggregate switch can aggregate traffic from one or more downstream access switches. In this example, aggregate switches 103, 104, and 105 can be coupled to an access layer 118, which can include access switches 111, 112, 113, 114, 115, and 116. Access layer 118 can facilitate access to fabric 110 to a number hosts 121, 122, 123, 124, 125, and 126. Examples of hosts can include, but are not limited to, laptops, desktops, printers, cellphones, tablets, IoT devices, and appliances. Access switch 115 can provide access coverage to hosts 124 and 125. Similarly, access switches 111, 112, 113, and 116 can provide access coverage to hosts 121, 122, 123, and 126, respectively.

With existing technologies, when host 123 joins the coverage of access switch 113, access switch 113 can authenticate host 123 from an authentication server 140. The authentication of host 123 can be based on an authentication process supported by access layer 118. For example, the authentication process can be based on a port-based (e.g., IEEE 802.1X) or username/password-based authentication. If host 123 is successfully authenticated by authentication server 140, access switch 113 can determine a host type of host 123 and allocate a VLAN 134 to host 123 based on the host type. The host type may be provided by authentication server 140 and can indicate the affiliation between the user of the host and the entity associated with VPN 130. The host type can indicate one or more of: a department of a user of host 123, a level of access granted to the user, and a domain of communication for host 123.

For example, if host 123 is associated with a user with administrative privilege, VLAN 134 can be an administrator VLAN. On the other hand, if host 123 is associated with a guest user, VLAN 134 can be a guest VLAN. In the same way, corresponding access switches of access layer 118 can allocate VLAN 132 to hosts 121, 124, 125, and 126, and VLAN 134 to host 122. Access switch 113 can then forward packets from host 123 to fabric 110 via VLAN 134. In other words, access switch 113 may tag the packets from host 123 with a VLAN identifier of VLAN 134. However, since different types of users may couple to access switch 113 at any time, and such access pattern may not be predictable, access switch 113 may not have a host belonging to a particular VLAN, such as VLAN 132, under its coverage. To ensure that a host on VLAN 132 can join the coverage of access switch 113 and send packets to fabric 110, access switch 113 may need to maintain all VLANs configured in network 100.

Access switches 113 and 114 can be coupled to aggregate switch 104 to forward traffic to fabric 110. Consequently, the packets forwarded by access switch 113 can enter fabric 110 via aggregate switch 104. Upon receiving the packet, aggregate switch 104 can determine a TNI (e.g., a VNI) corresponding to VLAN 134 of the packet. Aggregate switch 104 can also determine a remote tunnel endpoint, such as switch 102, in fabric 110 based on the header information of the packet. Aggregate switch 104 can maintain a mapping between the VLAN and the TNI for determining the TNI. Aggregate switch 104 can then encapsulate the packet with a tunnel header with the TNI and a destination address corresponding to switch 102. Subsequently, aggregate switch 104 can forward the encapsulated packet via the tunnel to switch 102. To identify switch 102 as the remote tunnel endpoint, aggregate switch 104 needs to participate in the routing process of VPN 130 based on the TNI. The participation can include sharing of routing information associated with the TNI with the rest of fabric 110.

Because of the unpredictability of association between a host and access switches 113 and 114, on which VLAN aggregation switch 104 may receive traffic is also unpredictable. Hence, aggregate switch 104 may need to participate in the routing process of VPN 130 for a respective TNI. For example, if VPN 130 is an EVPN and the TNI is a VNI, aggregate switch 130 may participate in the VRF associated with the EVPN for a respective VNI. Consequently, aggregate switch 104 may exchange broadcast information with other switches of the fabric for the TNI. Even if access switches 113 and 114 may not have a downstream host on a VLAN, the corresponding TNI can become part of the broadcast domain of VPN 130. As a result, aggregate switch 104 may unnecessarily receive multi-destination traffic associated with the VLAN.

Furthermore, to identify the remote tunnel endpoint for a packet, aggregate switch 104 may need to know identifying information, such as a MAC address, of a respective host reachable via a respective remote switch of VPN 130. Fabric 110 can facilitate this feature by sharing the learned MAC addresses among switches 101, 102, 103, 104, and 105. However, if aggregate switch 104 is not coupled to a downstream host belonging to a VLAN, aggregate switch 104 does not need to learn the MAC addresses of hosts on that VLAN. Consequently, unnecessarily learned MAC addresses may strain the limited resources of the switch hardware of aggregate switch 104. Moreover, if aggregate switch 104 needs to maintain the MAC addresses of all hosts coupled to fabric 110 and participate in all broadcast domains, triaging and troubleshooting aggregate switch 104 may become error-prone and cumbersome.

To solve this problem, a respective aggregate switch of aggregation layer 108 can be configured with a respective VLAN and a corresponding TNI of network 100. For example, aggregate switch 104 can maintain a mapping between VLANs 132 and 134, and the corresponding TNIs. However, aggregate switch 104 may maintain the VLAN and TNI pairs in an "inactive" state. Aggregate switch 104 may not participate in the routing process in VPN 130 for the TNI. Consequently, other switches 101, 102, 103, and 105 of fabric 110 may not send multi-destination traffic or learned MAC addresses associated with the VLAN to aggregate switch 104. Thus, aggregate switch 104 can avoid receiving multi-destination traffic or learning MAC address for a VLAN without a downstream host, such as VLAN 132.

Similarly, access switches of aggregate switch 104, which are access switches 113 and 114, can be configured with VLANs 132 and 134. However, access switch 113 may maintain VLANs 132 and 134 in an "inactive" state. Since access switch 113 may not participate in fabric 110 or VPN 130, access switch 113 may not use a TNI. When access switch 113 receives a packet from host 123, upon successful authentication by authentication server 140, access switch 113 can determine VLAN 134 for host 123. Access switch 113 can then activate VLAN 134 for the local switch (i.e., access switch 113) and send a notification message to aggregate switch 104 regarding the activation of VLAN 134. The notification message can be in a format recognizable by both access switch 113 and aggregate switch 104. For example, the notification message can be based on an MRP, such as MVRP, deployed by access switch 113 and aggregate switch 104. The notification message may also be a TLV message.

Upon receiving the notification message, aggregate switch 104 can look up VLAN 134 in the mapping and determine the TNI. Aggregate switch 104 can then activate VLAN 134 and the TNI. Aggregate switch 104 can also initiate participation in the routing (e.g., in a corresponding VRF) of VPN 130 using the TNI. In this way, aggregate switch 104 can dynamically activate a virtual network in fabric 110. Based on the activation, aggregate switch 104 can start receiving multi-destination traffic and MAC addresses associated with VLAN 134 from other switches since host 123 on VLAN 134 is under the coverage of downstream access switch 113. Since aggregate switch 104 activates a VLAN if a host on that VLAN is under the coverage of access switch 113 or 114, aggregate switch 104 may not activate VLAN 132 and its corresponding TNI. In this way, aggregate switch 104 can avoid receiving multi-destination traffic and learned MAC addresses associated with VLAN 132.

Typically, access switch 113 can be a switch with low complexity that may not support tunneling. Hence, a connection 117 between access switch 113 and aggregate switch 104 can be an Ethernet and/or IP connection. Connection 117 can include one or more wired and/or wireless links coupling access switch 113 to aggregate switch 104. However, if access switch 113 supports tunneling, access switch 113 may not support a VPN. Connection 1117 can then be a tunnel that does not participate in VPN 130. Under such circumstances, the notification from access switch 113 can be encapsulated with a tunnel encapsulation header and sent via tunnel 117.

A reserved TNI (e.g., a VNI 0 reserved for control traffic) can be used in the tunnel encapsulation header. For example, if the notification message is based on MVRP, access switch 113 can encapsulate the MVRP PDU with the tunnel encapsulation header and send the encapsulated packet to aggregate switch 104 via the tunnel. Aggregate switch 104 can receive the encapsulated packet from the tunnel and decapsulate a tunnel encapsulation header of the encapsulated packet. Aggregate switch 104 can then obtain the MVRP PDU from the packet based on the decapsulation.

Figure 2A:
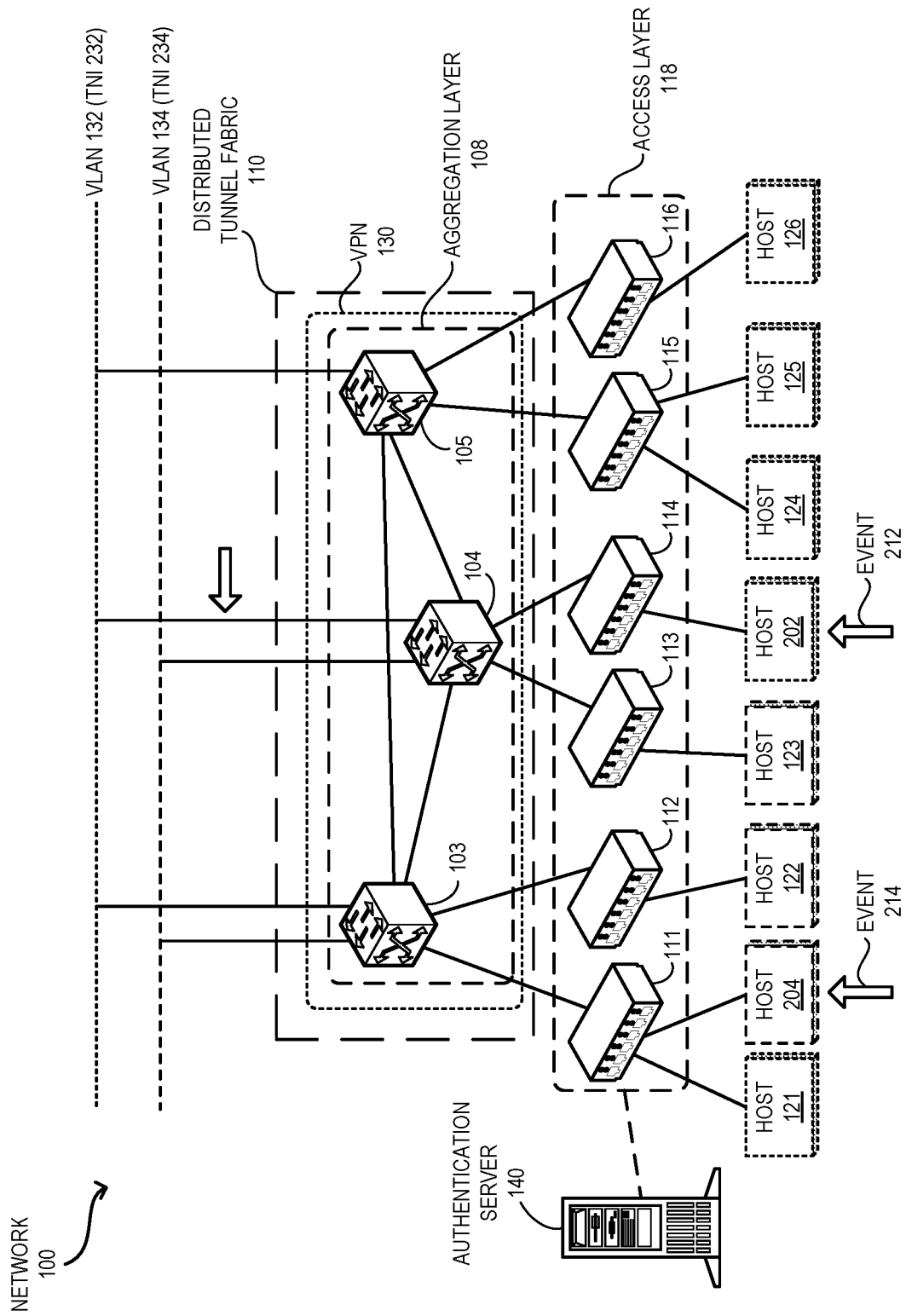
FIG. 2A illustrates exemplary dynamic activations of virtual networks in a distributed tunnel fabric, in accordance with an aspect of the present application.

When a new host appears in the coverage of an access switch, the access switch and the upstream aggregate switch may need to activate a new VLAN. FIG. 2A illustrates exemplary dynamic activations of virtual networks in a distributed tunnel fabric, in accordance with an aspect of the present application. During operation, a new host 202 can appear in the coverage of access switch 114 due to an event 212. Examples of event 212 include, but are not limited to, host 202 connecting to network 100 via a new wireless connection or due to a virtual machine (VM) movement, and a power cycle of host 202. When access switch 114 receives the initial or first packet from host 202, access switch 114 authenticate host 202 from authentication server 140. Upon successful authentication, access switch 114 can determine the host type for host 202.

For example, authentication server 140 can indicate the affiliation between the user of host 202 and VPN 130. Based on the host type, access switch 114 can determine that host 202 should be placed on VLAN 132. Since host 202 is the first (or initial) host on VLAN 132 under access switch 114's coverage, access switch 114 can activate VLAN 132. The activation of VLAN 132 allows access switch 114 to tag the packet with a VLAN identifier of VLAN 132 and forward the tagged packet to aggregate switch 104 via VLAN 132. Access switch 114 can then send a notification message to aggregate switch 104 regarding the activation of VLAN 132. Upon receiving the notification message, aggregate switch 104 can determine whether VLAN 132 should be activated.

Aggregate switch 104 can be configured with a mapping between VLANs 132 and 134 and their corresponding TNIs 232 and 234, respectively. Since VLAN 132 has not been activated in aggregate switch 104, aggregate switch 104 can determine TNI 232 from the mapping. Aggregate switch 104 can then activate VLAN 132 and TNI 232. Aggregate switch 104 can also initiate participation in the routing of VPN 130 using TNI 232. In this way, aggregate switch 104 can dynamically activate a virtual network in fabric 110 when a downstream switch activates the VLAN. Based on the activation, aggregate switch 104 can start receiving multi-destination traffic and MAC addresses associated with VLAN 132 from other switches. Access switch 114 can then forward host 202's initial (or first) packet (and subsequent packets) tagged with an identifier of VLAN 132 to aggregate switch 104.

Suppose that another new host 204 appears in the coverage of access switch 111 due to an event 214. When access switch 111 receives the initial packet from host 204, access switch 111 authenticate host 204 from authentication server 140. Upon successful authentication, access switch 114 can determine the host type for host 204. Based on the host type, access switch 111 can determine that host 204 should be placed on VLAN 134. Since host 204 is the initial host on VLAN 134 under access switch 111's coverage, access switch 111 can activate VLAN 134. Access switch 111 can then send a notification message to aggregate switch 103 regarding the activation of VLAN 134. Upon receiving the notification message, aggregate switch 103 can determine whether VLAN 134 should be activated.

Even though host 204 is the initial host on VLAN 134 under the coverage of access switch 111, another host 122 on VLAN 134 can be under the coverage of access switch 112. Since both access switches 111 and 112 are downstream switches of aggregate switch 103, VLAN 134 has already been activated at aggregate switch 103 due to the presence of host 122. Therefore, when aggregate switch 103 receives the notification message from access switch 111, aggregate switch 103 can determine that VLAN 134 has already been activated and aggregate switch 103 has been participating in the routing process of VPN 130 using TNI 234. Consequently, aggregate switch 103 does not need to activate VLAN 134. Access switch 111 can then forward host 204's initial packet (and subsequent packets) tagged with an identifier of VLAN 134 to aggregate switch 103.

Figure 2B:
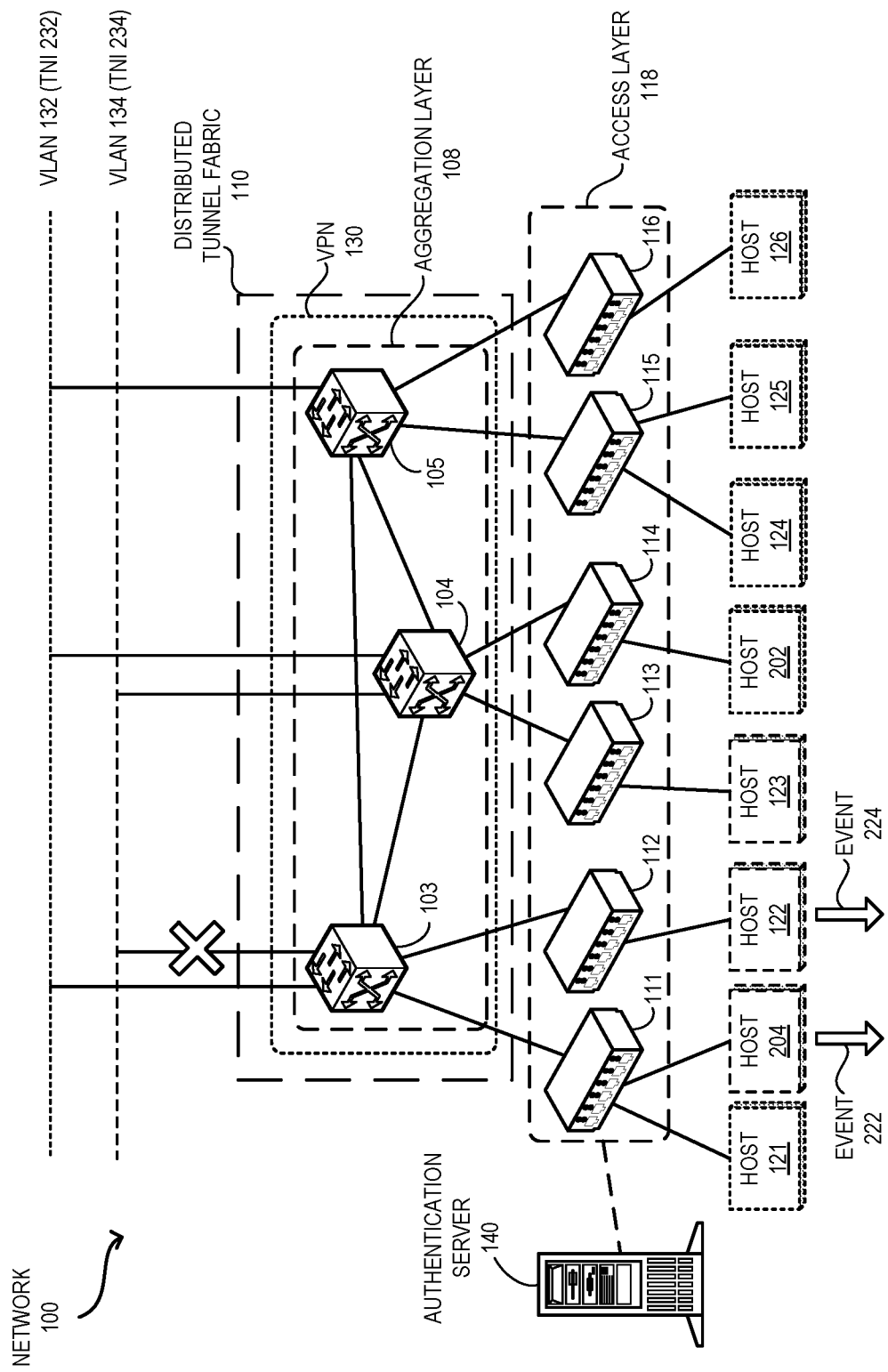
FIG. 2B illustrates exemplary dynamic deactivations of virtual networks in a distributed tunnel fabric, in accordance with an aspect of the present application.

On the other hand, when a host leaves in the coverage of an access switch, the access switch and the upstream aggregate switch may need to deactivate a new VLAN. FIG. 2B illustrates exemplary dynamic deactivations of virtual networks in a distributed tunnel fabric, in accordance with an aspect of the present application. A respective aggregate switch of aggregation layer 108 can ensure that VLAN 132 or 134, and the corresponding TNI 232 or 234, respectively, become inactive if no host belonging to the VLAN remains in the coverage of the downstream access switches. Suppose that host 204 leaves the coverage of access switch 111 due to event 222. Since host 204 is the last host on VLAN 134 under access switch 111's coverage, access switch 111 can deactivate VLAN 134. Access switch 111 can then send a notification message regarding the deactivation of VLAN 134 to aggregate switch 103.

Upon receiving the notification message from access switch 111, aggregate switch 103 can determine whether other hosts belonging to VLAN 134 remain under the coverage of at least one downstream access switch. Since host 122 may remain under the coverage of access switch 112, aggregate switch 103 may continue to maintain an active status for VLAN 134 and TNI 234. Aggregate switch 103 can continue to participate in the routing of VPN 130 for TNI 234. The participation can include sharing routing information associated with TNI 234 with the rest of fabric 110. Suppose that another host 122 leaves the coverage of access switch 112 due to event 224. Since host 122 is the last host on VLAN 134 under access switch 112's coverage, access switch 112 can deactivate VLAN 134. Access switch 112 can then send a notification message regarding the deactivation of VLAN 134 to aggregate switch 103.

Upon receiving the notification message from access switch 112, aggregate switch 103 can determine whether other hosts belonging to VLAN 134 remain under the coverage of at least one downstream access switch. Since no other host belonging to VLAN 134 remains, aggregate switch 103 can deactivate VLAN 134 and TNI 234. Aggregate switch 103 can then withdraw TNI 234 from fabric 110. The withdrawal may cause aggregate switch 103 to stop participating in the VRF associated with VPN 130. However, VLAN 134 and TNI 234 may remain configured in aggregate switch 103. If another host joins the coverage of access switch 111 or 112, aggregate switch 103 can reactive VLAN 134 and TNI 234.

In some examples, aggregate switch 103 can maintain a counter to indicate a number (or count) of hosts on a VLAN that are under the coverage of a downstream access switch. The counter can be a non-negative integer. The initial value of the counter (e.g., a value of 0) may indicate the absence of any host on that VLAN. For example, when host 122 appears under access switch 112's coverage, based on the notification from access switch 112, aggregate switch 103 can increment the counter associated with VLAN 134. Similarly, when host 204 appears under access switch 111's coverage, based on the notification from access switch 111, aggregate switch 103 can increment the counter associated with VLAN 134.

On the other hand, when host 204 leaves access switch 111's coverage, based on the notification from access switch 111, aggregate switch 103 can decrement the counter associated with VLAN 134. However, based on the non-initial value (e.g., a non-zero value) of the counter, aggregate switch 103 can determine that host 204 is not the last host on VLAN 134. Aggregate switch 103, therefore, can maintain an active status for VLAN 134 and TNI 234. When host 122 leaves access switch 112's coverage, based on the notification from access switch 112, aggregate switch 103 can decrement the counter associated with VLAN 134. At that point, the counter can have its initial value. Consequently, aggregate switch 103 may deactivate VLAN 134 and TNI 234, and withdraw TNI 234 from VPN 130.

In some examples, aggregate switch 103 may maintain a VLAN activation indicator, which can be a counter based on a non-negative integer. Whenever aggregate switch 103 receives the notification indicating the activation of a VLAN, aggregate switch 103 can increment the indicator. On the other hand, whenever aggregate switch 103 receives the notification indicating the deactivation of a VLAN, aggregate switch 103 can decrement the indicator. An initial value (e.g., a value of zero) can indicate that the VLAN is inactive in all downstream access switches (i.e., in both access switches 111 and 112). The VLAN activation indicator allows aggregate switch 103 to avoid tracking individual hosts while keeping track of the initial activation and final deactivation of the VLAN.

Figure 3A:
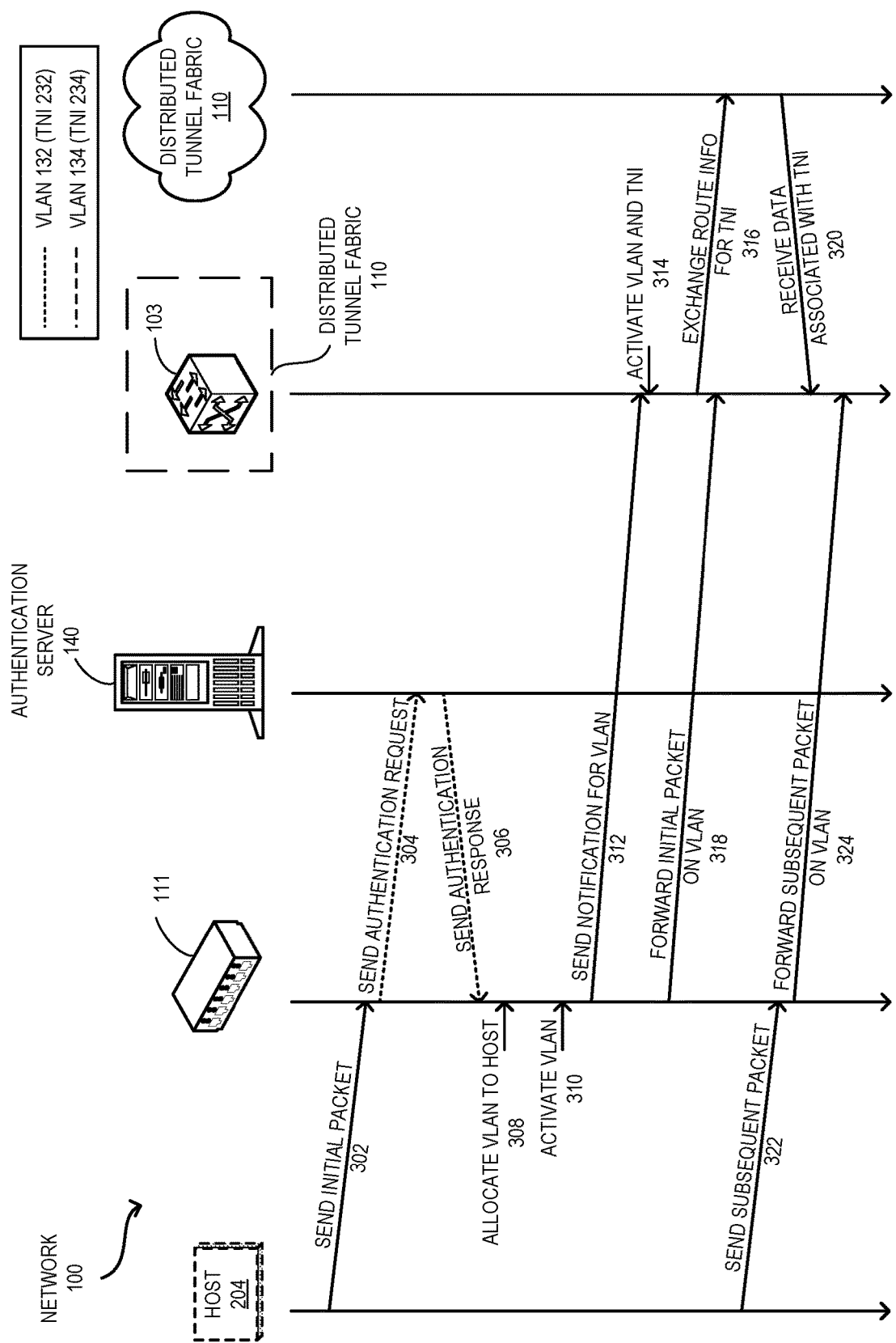
FIG. 3A illustrates exemplary communications for dynamically activating a virtual network in a distributed tunnel fabric, in accordance with an aspect of the present application.

FIG. 3A illustrates exemplary communications for dynamically activating a virtual network in a distributed tunnel fabric, in accordance with an aspect of the present application. During operation, host 204 can send an initial packet to access switch 111 (operation 302). Access switch 111 can then send an authentication request to authentication server 140 (operation 304). Authentication server 140 can authenticate host 204 based on an authentication process and send an authentication response to access switch 111 (operation 306). The authentication response can indicate whether the authentication is successful and a host type of host 204. Upon successful authentication, access switch 111 can allocate a VLAN to host 204 (operation 308) and activate the allocated VLAN (operation 310).

Access switch 111 can then send a notification for the VLAN (e.g., indicating an activation of the VLAN) to aggregate switch 103 (operation 312). If the VLAN has not been activated, aggregate switch 103 can activate the VLAN and the corresponding TNI (operation 314). Aggregate switch 103 can exchange route information for the TNI with the rest of fabric 110 (operation 316). In response to the activation of the VLAN, access switch 111 can forward the initial packet on the VLAN to aggregate switch 103 (operation 318). Based on the exchanged route information, aggregate switch 103 can receive data (e.g., multi-destination packets and learned MAC addresses) associated with the TNI (operation 320). When host 204 sends a subsequent packet (operation 322), access switch 111 can then forward the subsequent packet on the VLAN (operation 324). In this way, aggregate switch 103 can dynamically activate a virtual network in fabric 110.

Figure 3B:
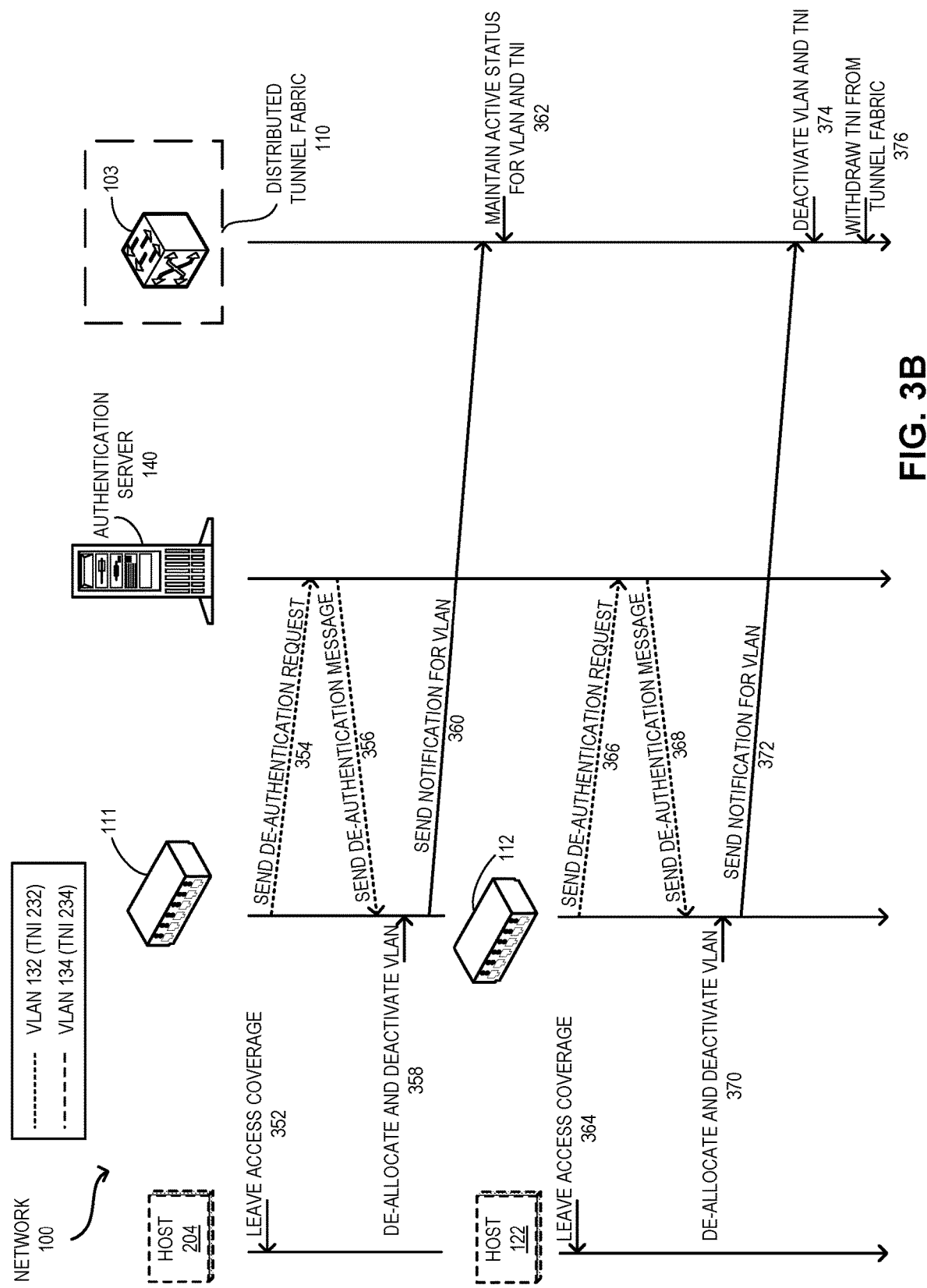
FIG. 3B illustrates exemplary communications for dynamically deactivating a virtual network in a distributed tunnel fabric, in accordance with an aspect of the present application.

FIG. 3B illustrates exemplary communications for dynamically deactivating a virtual network in a distributed tunnel fabric, in accordance with an aspect of the present application. During operation, host 204 may leave the access coverage of access switch 111 (operation 352). Upon detecting the leave operation, access switch 111 can send a de-authentication request to authentication server 140 (operation 354). Authentication server 140 may also detect the leave operation due to the expiration of the session for host 204 (e.g., due to the expiration of a session timer). Authentication server 140 can then send a de-authentication message to access switch 111 for host 204 (operation 356).

Access switch 111 can then de-allocate and deactivate the VLAN (operation 358). Subsequently, access switch 111 can send a notification for the VLAN (e.g., indicating the deactivation of the VLAN) to aggregate switch 103 (operation 360). Even though host 204 may be the last host on the VLAN for access switch 111, aggregate switch 103 can have other downstream hosts on the VLAN, such as host 122. Consequently, aggregate switch 103 can maintain the active status for the VLAN and TNI (operation 362). Suppose that host 122 leaves the access coverage of access switch 112 (operation 364). Upon detecting the leave operation, access switch 112 can send a de-authentication request to authentication server 140 (operation 366). Authentication server 140 can then send a de-authentication message to access switch 112 for host 112 (operation 368).

Access switch 112 can then de-allocate and deactivate the VLAN (operation 370). Subsequently, access switch 112 can send a notification for the VLAN to aggregate switch 103 (operation 372). Since host 122 can be the last host on the VLAN for access switch 112 as well as aggregate switch 103, aggregate switch 103 can deactivate the VLAN and TNI (operation 374). Aggregate switch 103 can then withdraw the TNI from fabric 110 (operation 376). The withdrawal may cause aggregate switch 103 to stop participating in the VRF associated with VPN 130, as described in conjunction with FIG. 2B. However, the VLAN and TNI may remain configured in aggregate switch 103. If another host joins the coverage of access switch 111 or 112, aggregate switch 103 can reactive the VLAN and TNI.

Figure 4A:
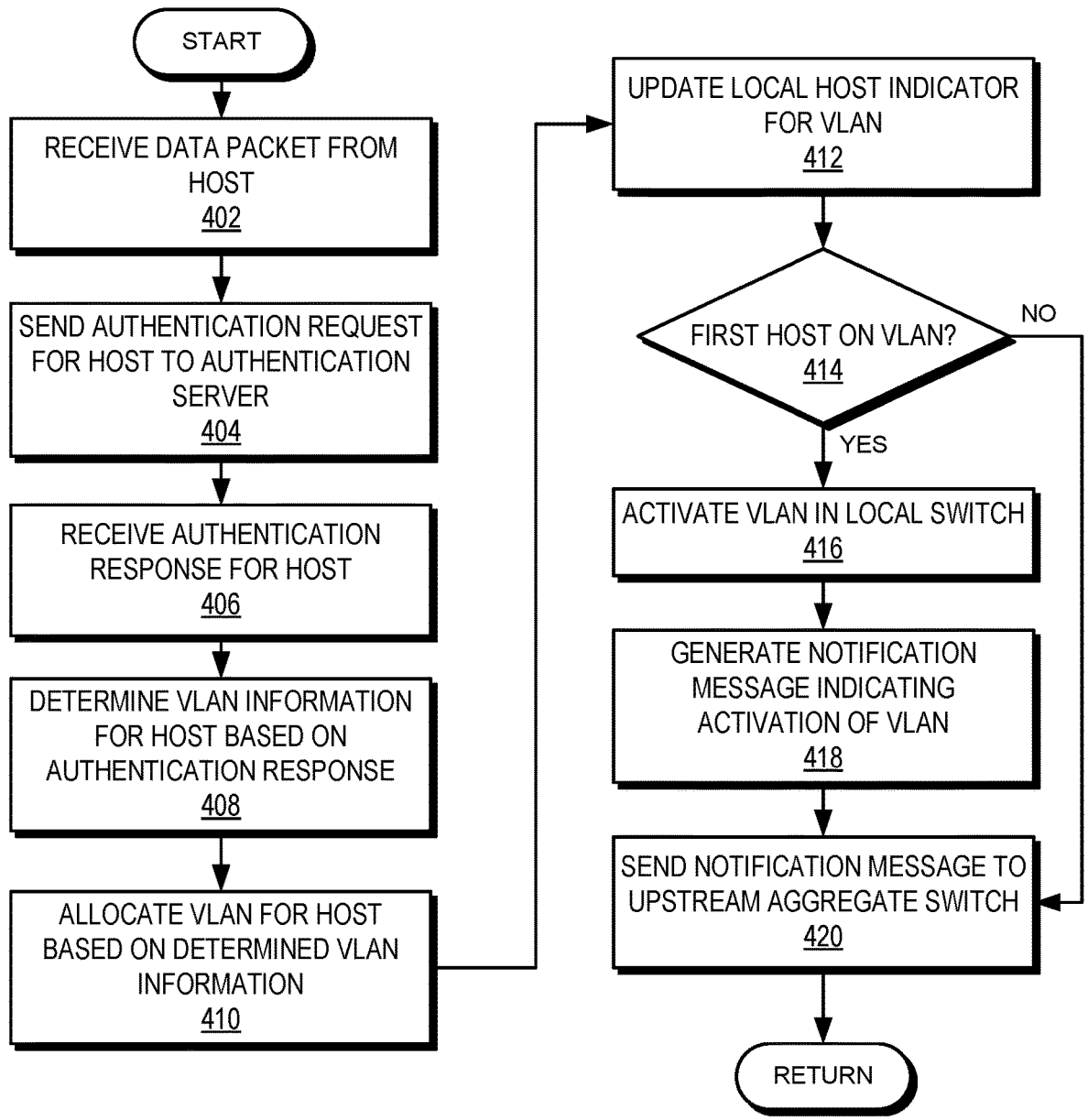
FIG. 4A presents a flowchart illustrating the process of an access switch managing the virtual network of an incoming host, in accordance with an aspect of the present application.

FIG. 4A presents a flowchart illustrating the process of an access switch managing the virtual network of an incoming host, in accordance with an aspect of the present application. During operation, the access switch can receive a data packet from a host (operation 402) and send an authentication request for the host to an authentication server (operation 404). The access switch can then receive an authentication response for the host (operation 406). The authentication response can indicate a successful authentication and a host type. The authentication response may indicate an unsuccessful authentication. The access switch can determine VLAN information for the host based on the authentication response (operation 408) and allocate the VLAN for the host based on the determined VLAN information (operation 410).

The access switch can then update a local host indicator for the VLAN (operation 412). In some examples, the host indicator can be a counter indicating the number of hosts belonging to the VLAN, and the update operation can be an increment operation. The access switch can determine whether the host is the first (or initial) host on the VLAN (operation 414). For example, if the host indicator is at an initial increment value, such as a value of one, the access switch can determine the presence of the initial host. If the host is the initial host, the access switch can activate the VLAN in the local switch (operation 416) and generate a notification message indicating the activation of the VLAN (operation 418). The access switch can then send the notification message to the upstream aggregate switch (operation 420).

Figure 4B:
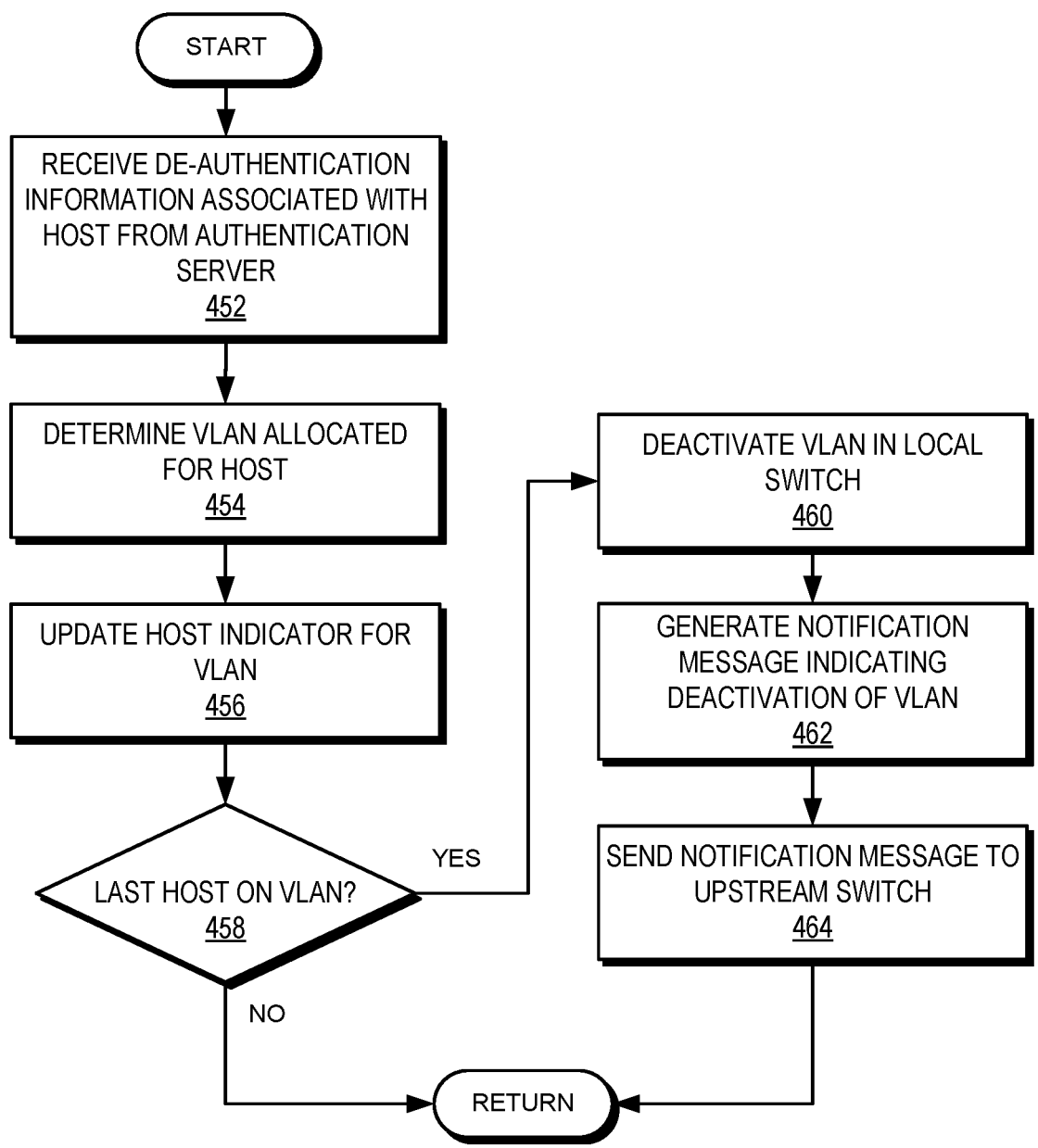
FIG. 4B presents a flowchart illustrating the process of an access switch managing the virtual network of a departing host, in accordance with an aspect of the present application.

FIG. 4B presents a flowchart illustrating the process of an access switch managing the virtual network of a departing host, in accordance with an aspect of the present application. During operation, the access switch can receive de-authentication information associated with a host from an authentication server (operation 452). The authentication server may issue the de-authentication information in response to a request from the access switch or the expiration of an authentication session of the host. The access switch can then determine the VLAN allocated for the host (operation 454) and update the host indicator for the VLAN (operation 456).

Subsequently, the access switch can determine whether the host is the last (or final) host on the VLAN (operation 458). For example, if the host indicator is at an initial value, such as a value of zero, the access switch can determine that the last host has left. If the host is the last host, the access switch can deactivate the VLAN in the local switch (operation 460) and generate a notification message indicating the deactivation of the VLAN (operation 462). The access switch can then send the notification message to the upstream aggregate switch (operation 464).

Figure 5A:
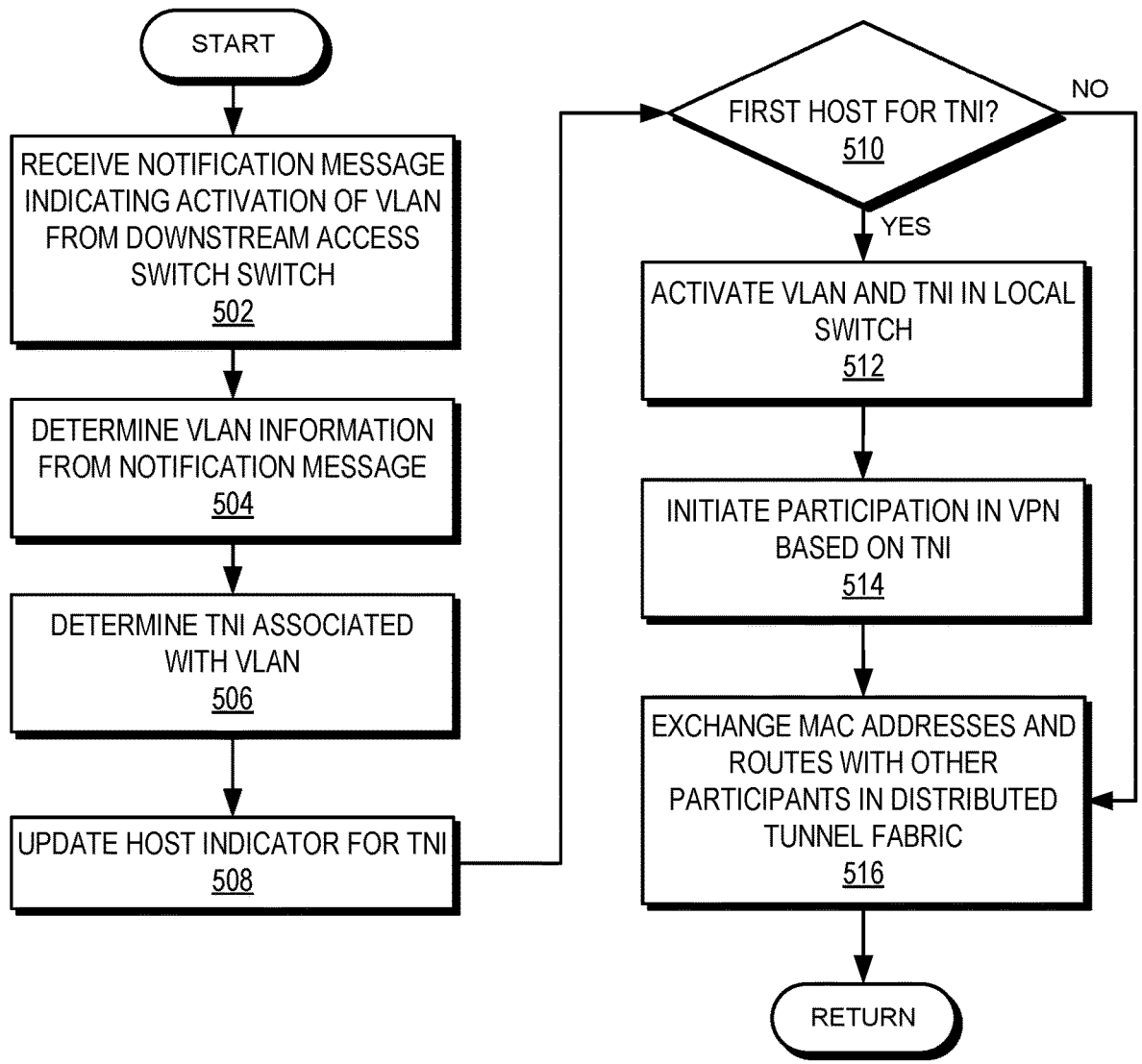
FIG. 5A presents a flowchart illustrating the process of an aggregate switch managing the virtual network of an incoming host in a distributed tunnel fabric, in accordance with an aspect of the present application.

FIG. 5A presents a flowchart illustrating the process of an aggregate switch managing the virtual network of an incoming host in a distributed tunnel fabric, in accordance with an aspect of the present application. During operation, the aggregate switch can receive a notification message indicating the activation of a VLAN from a downstream access switch (operation 502). The aggregate switch can then determine VLAN information for the host from the notification message (operation 504) and determine a TNI associated with the VLAN (operation 506). In some examples, the aggregate switch can be configured with the TNI. The aggregate switch can then maintain a mapping between the VLAN and TNI.

The aggregate switch can then update a local host indicator for the TNI (operation 508). In some examples, the host indicator can be a counter indicating the number of hosts associated with the TNI, and the update operation can be an increment operation. The aggregate switch can determine whether the host is the first (or initial) host for the TNI (operation 510). If the host is the first host, the aggregate switch can activate the VLAN and TNI in the local switch (operation 512). The aggregate switch may initialize participation in VPN based on the TNI (operation 514). The aggregate switch can then exchange MAC addresses and routes with other participants in the distributed tunnel fabric (operation 516).

Figure 5B:
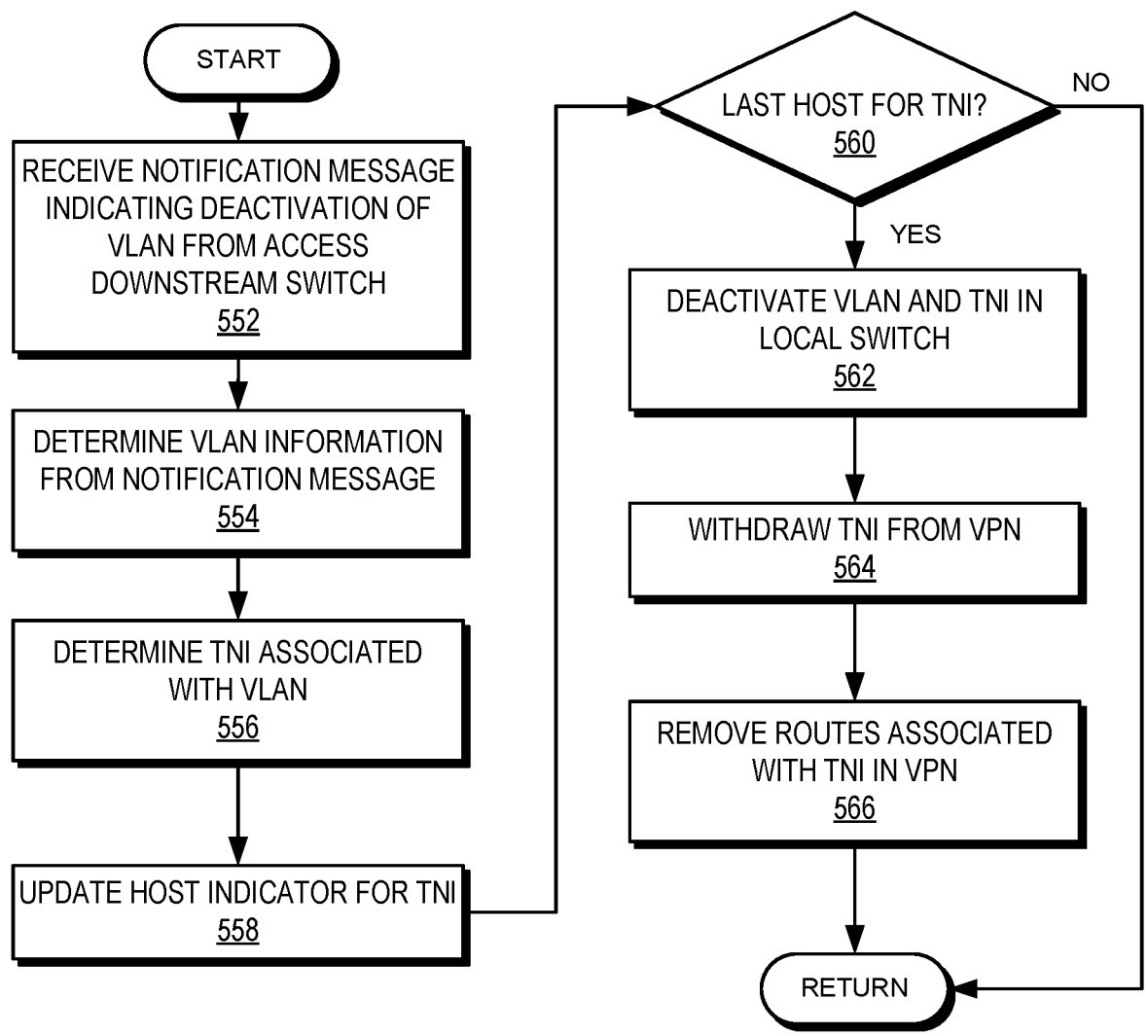
FIG. 5B presents a flowchart illustrating the process of an aggregate switch managing the virtual network of a departing host in a distributed tunnel fabric, in accordance with an aspect of the present application.

FIG. 5B presents a flowchart illustrating the process of an aggregate switch managing the virtual network of a departing host in a distributed tunnel fabric, in accordance with an aspect of the present application. During operation, the aggregate switch can receive a notification message indicating the deactivation of a VLAN from a downstream access switch (operation 552). The aggregate switch can then determine VLAN information for the host from the notification message (operation 554) and determine a TNI associated with the VLAN (operation 556).

The aggregate switch can then update a local host indicator for the TNI (operation 558). The aggregate switch can determine whether the host is the last (or final) host for the TNI (operation 560). If the host is the last host, the aggregate switch can deactivate the VLAN and TNI in the local switch (operation 562). The aggregate switch may withdraw the TNI from the VPN (operation 564). The aggregate switch can then remove routes associated with the TNI in the VPN (operation 566).

Figure 6:
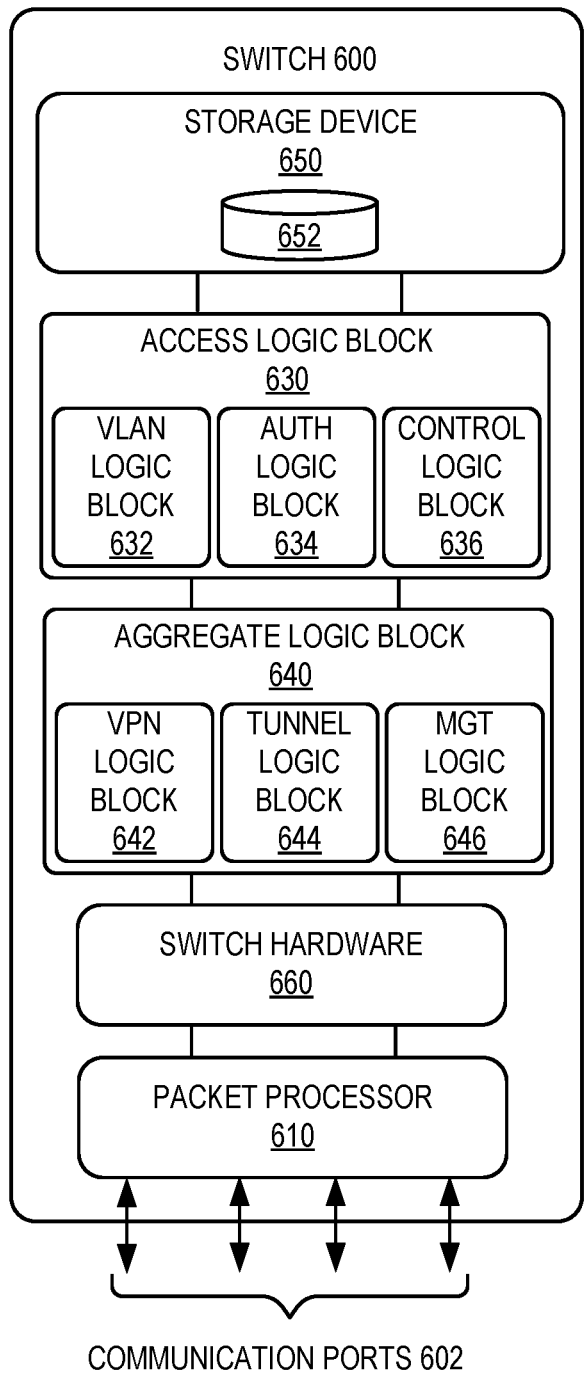
FIG. 6 illustrates an exemplary switch supporting dynamic activation of virtual networks, in accordance with an aspect of the present application.

FIG. 6 illustrates an exemplary switch supporting dynamic activation of virtual networks, in accordance with an aspect of the present application. In this example, a switch 600 includes a number of communication ports 602, a packet processor 610, and a storage device 650. Switch 600 can also include switch hardware 660 (e.g., processing hardware of switch 600, such as its ASIC chips), which includes information based on which switch 600 processes packets (e.g., determines output ports for packets). Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with a respective VLAN and/or TNI.

If switch 600 operates as an access switch, switch 600 can include an access logic block 630. Access logic block 630 can include a VLAN logic block 632, an authentication logic block 634, and a control logic block 636. VLAN logic block 632 can activate and deactivate a VLAN on switch 600 in response to the first host joining and the last host leaving, respectively, the coverage of switch 600 on the VLAN. Authentication logic block 634 can authenticate a new host with an authentication server and determine the departure of a host based on de-authentication from the authentication server. Control logic block 636 can notify an aggregate switch regarding the activation and deactivation of a VLAN using a notification control message.

If switch 600 operates as an aggregate switch, switch 600 can include an aggregate logic block 640. Aggregate logic block 640 can include a VPN logic block 642, a TNI logic block 644, and a route logic block 646. VPN logic block 642 can allow switch 600 to participate in a VPN, such as an EVPN, over a distributed tunnel fabric. Tunnel logic block 644 can initiate and terminate tunnels, thereby operating switch 600 as a tunnel endpoint (e.g., VXLAN VTEP). Based on the notification from an access switch, management logic block 646 can activate and deactivate a VLAN and the corresponding TNI. Accordingly, management logic block 646 can also initiate the participation in the routing of the VPN based on the TNI.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   operating a switch as a tunnel endpoint of a tunnel in conjunction with a remote switch, which operates as another tunnel endpoint of the tunnel, wherein the tunnel facilitates a virtual private network (VPN) coupling the switch and the remote switch;
   maintaining an inactive state for a virtual local area network (VLAN) and a corresponding tunnel network identifier identifying the VLAN for the tunnel, wherein the inactive state precludes the switch from using the tunnel network identifier for a routing process of the VPN;
   in response to receiving a notification indicating activation of the VLAN at a downstream switch, activating the VLAN at the switch; and
   activating the tunnel network identifier in the routing process of the VPN, thereby allowing sharing of a respective media access control (MAC) address associated with the VLAN via the tunnel for the VPN.

2. The method of claim 1, further comprising, in response to activating the tunnel network identifier in the routing process of the VPN, receiving multi-destination traffic associated with the VLAN via the tunnel.

3. The method of claim 1, further comprising:
   in response to receiving a second notification indicating deactivation of the VLAN at a downstream switch, determining whether the VLAN is active in any other downstream switch; and
   in response to determining that the VLAN is not active in any other downstream switch, deactivating the VLAN and the tunnel network identifier at the switch.

4. The method of claim 3, wherein deactivating the tunnel network identifier further comprises withdrawing the tunnel network identifier from the routing process of the VPN.

5. The method of claim 1, further comprising:
   maintaining an indicator indicating whether the VLAN is active in at least one of all downstream access switches; and
   activating and deactivating the tunnel network identifier at the switch based on a value of the indicator.

6. The method of claim 1, wherein the downstream switch is an access switch outside of the VPN, and wherein the switch is an aggregate switch configured to aggregate traffic from one or more access switches.

7. The method of claim 1, wherein the notification is a Multiple VLAN Registration Protocol (MVRP) data unit, and wherein the switch and the downstream switch deploy MVRP to discover VLANs.

8. The method of claim 7, further comprising:
   decapsulating a tunnel encapsulation header of a packet received via a second tunnel between the switch and the downstream switch; and
   obtaining the MVRP data unit from the packet based on the decapsulation.

9. The method of claim 1, wherein the VLAN and the tunnel network identifier are pre-configured at the switch; and
   wherein maintaining the inactive state for the tunnel network identifier comprises maintaining the inactive state for the pre-configuration.

10. A computer system, comprising:
    a processor;
    a non-transitory computer-readable storage medium storing instructions, which when executed by the processor causes the processor to perform a method, the method comprising:
      operating the computer system as a tunnel endpoint of a tunnel in conjunction with a remote computer system, which operates as another tunnel endpoint of the tunnel, wherein the tunnel facilitates a virtual private network (VPN) coupling the computer system and the remote computer system;
      maintaining an inactive state for a virtual local area network (VLAN) and a corresponding tunnel network identifier identifying the VLAN for the tunnel, wherein the inactive state precludes the computer system from using the tunnel network identifier for a routing process of the VPN;
      in response to receiving a notification indicating activation of the VLAN at a downstream switch, activating the VLAN at the computer system; and
      activating the tunnel network identifier in the routing process of the VPN, thereby allowing sharing of a respective media access control (MAC) address associated with the VLAN via the tunnel for the VPN.

11. The computer system of claim 10, wherein the method further comprises, in response to activating the tunnel network identifier in the routing process of the VPN, receiving multi-destination traffic associated with the VLAN via the tunnel.

12. The computer system of claim 10, wherein the method further comprises:
    in response to receiving a second notification indicating deactivation of the VLAN at a downstream switch, determining whether the VLAN is active in any other downstream switch; and
    in response to determining that the VLAN is not active in any other downstream switch, deactivating the VLAN and the tunnel network identifier at the computer system.

13. The computer system of claim 12, wherein deactivating the tunnel network identifier further comprises the tunnel network identifier withdrawing from the routing process of the VPN.

14. The computer system of claim 10, wherein the method further comprises:
   maintaining an indicator indicating whether the VLAN is active in at least one of all downstream access switches; and
   activating and deactivating the tunnel network identifier at the switch based on a value of the indicator.

15. The computer system of claim 10, wherein the downstream switch is an access switch outside of the VPN, and wherein the computer system is an aggregate switch configured to aggregate traffic from one or more access switches.

16. The computer system of claim 10, wherein the notification is a Multiple VLAN Registration Protocol (MVRP) data unit, and wherein the computer system and the downstream switch deploy MVRP to discover VLANs.

17. The computer system of claim 10, wherein the method further comprises:
   decapsulating a tunnel encapsulation header of a packet received via a second tunnel between the computer system and the downstream switch; and
   obtaining the MVRP data unit from the packet based on the decapsulation.

18. The computer system of claim 10, wherein the VLAN and the tunnel network identifier are pre-configured at the computer system; and
   wherein maintaining the inactive state for the tunnel network identifier comprises maintaining the inactive state for the pre-configuration.

19. The method of claim 1, wherein the routing process facilitates routing for a virtual routing and forwarding (VRF) associated with the tunnel.

20. The computer system of claim 10, wherein the routing process facilitates routing for a virtual routing and forwarding (VRF) associated with the tunnel.

* * * * *